Sept. 15, 1925.

J. G. PERRIN

TIRE CARRIER

Original Filed Oct. 17, 1913  2 Sheets-Sheet 1

1,553,325

Sept. 15, 1925.　　　　　　　　　　　　　　　　1,553,325
J. G. PERRIN
TIRE CARRIER
Original Filed Oct. 17, 1913　2 Sheets-Sheet 2

Patented Sept. 15, 1925.

1,553,325

UNITED STATES PATENT OFFICE.

JOHN G. PERRIN, OF DETROIT, MICHIGAN.

TIRE CARRIER.

Application filed October 17, 1913, Serial No. 795,631. Renewed June 8, 1917. Serial No. 173,650.

*To all whom it may concern:*

Be it known that I, JOHN G. PERRIN, a citizen of the United States, residing at Detroit, in the county of Wayne and State of Michigan, have invented certain new and useful Improvements in Tire Carriers, of which are following is a specification.

My invention relates to tire carriers for supporting one or more wheel tires in locked position on a road vehicle and one object of the invention is to provide a means for quickly and securely locking these tires in position on a suitable frame and for varying the engagement of the locking means with the tire when the locking means is moved into tire locking position.

A further object of my invention is to provide a carrier for supporting a plurality of tires arranged so that one of the tires may be removed without unlocking the other tires.

The various other objects of the invention will be more fully set forth in the following description of one form of mechanism embodying the invention, which consists in the new and novel features of construction and combination of parts hereinafter set forth and claimed.

Referring to the accompanying drawings.

Figure 1:
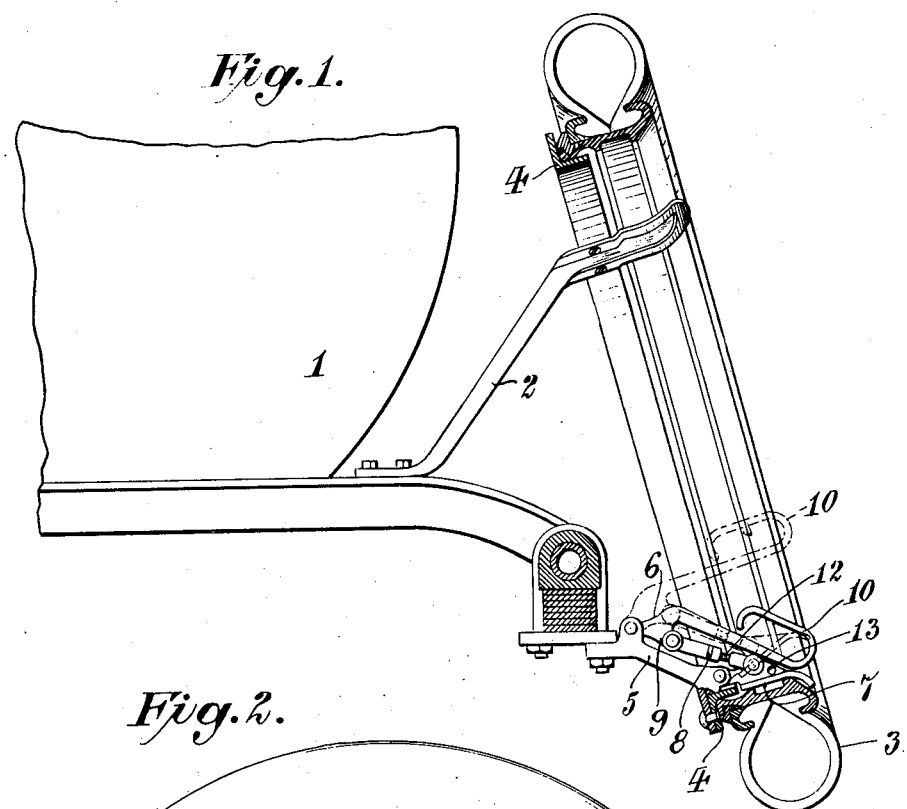
Figure 1 is a vertical central section through a preferred embodiment of the invention shown in position on the rear of an automobile.

In the drawings is shown a vehicle 1, from a suitable portion of the chassis of which extends a pair of upwardly converging spaced arms 2, the outer ends of which are constructed to engage with the inner periphery of the rim of the tire 3 to support the same. The tires are preferably disposed in an inclined position and bear against a support 4 carried by the arms which support the tire rim. The support is in the form of a continuous angle iron having an outstanding flange lapping the inner side of the rim and a band extending partly across the inner periphery of the tire rim. A bracket 5 or other suitable extension from the chassis, braces the lower portion of the support 4 and carries the locking mechanism hereinafter described, but it is obvious that the support 4 may be braced in position by any suitable means.

The tire is drawn into firm engagement with the arms 2 and the upper portion of the support 4 by means of a toggle 6 pivoted to the bracket 5 and a pivoted member 7 arranged to engage the inner periphery of the rim or tire and to move in a direction away from said fixed support 4 into a tire locking position.

Figure 2:
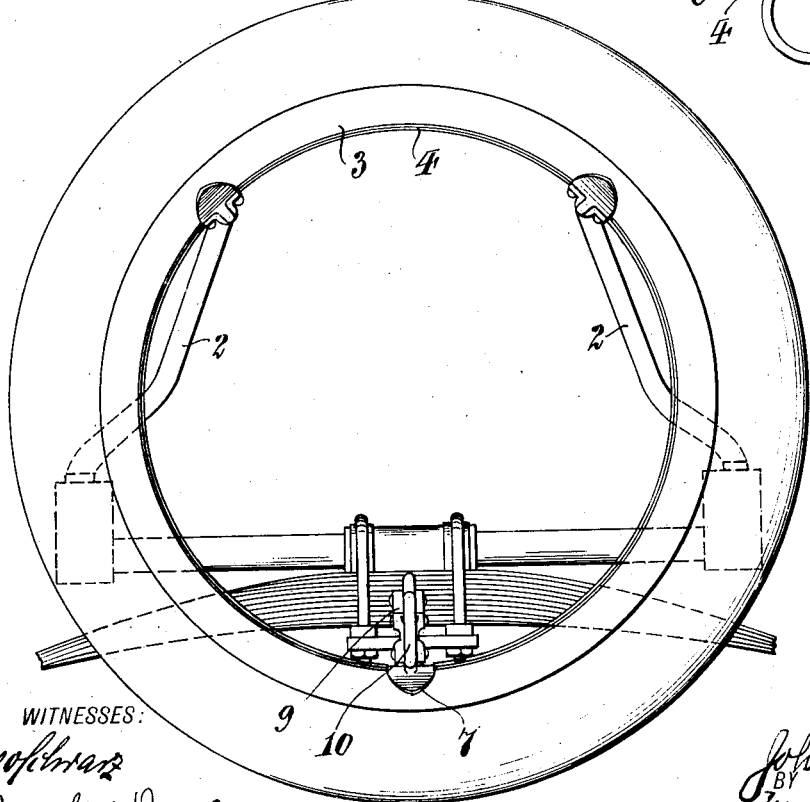
Figure 2 is a rear elevation of the device shown in Figure 1.

In the disclosure shown in Figures 1 and 2, the toggle includes a link 8 having one end pivoted to the member 7 and the other end pivoted to a lever 9 which in turn has one end pivoted to the bracket 5 and has its opposite end formed into an actuating handle 10. In the disclosure shown in Figures 3 and 4 the link 8 is pivoted to a connecting link 11, the opposite ends of which are pivoted to the tire engaging members 7. The pivotal connections of the link and lever are so disposed that the movement of the handle 10 into a limiting position will move the connections beyond an aligning position to lock the members 7 in engagement with the tires.

When the handle is in this locking position as shown in full lines in the drawing the member 7 has a fixed position. In order to vary this locking position of the tire engaging member to fit rims of different diameters, and to vary the engagement of the members with the rim, the link 8 is adjustable in length by some suitable means as the turn-buckle 12. Should it be desired to provide a means for preventing the manual unlocking of the device, an eye 13 is provided in the tire engaging member or in the connecting link 11 adapted to receive a padlock or other locking device.

In operation with the parts in the position shown in the drawing, the handle may be lifted into the dotted line position, shown in Figure 1, thereby releasing the engagement of the member 7 with the tire and permitting the same to be lifted off the arms 2 and support 4. After placing the tire in position on the support, the downward movement of the handle into the full line position causes the member to engage the tire rim and forces the tire down into firm engagement with the support 2 and laterally into the angle at the lower portion of the support 4.

Figure 3:
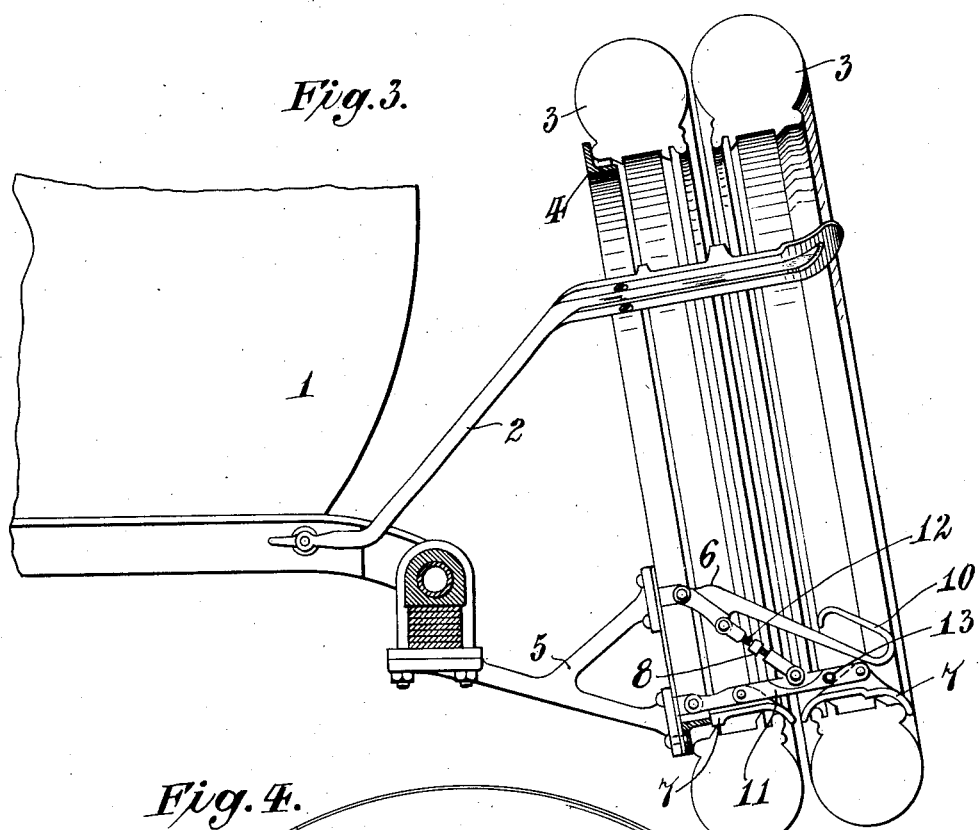
Figure 3 is a view similar to Figure 1 showing the device modified to support a pair of tires.
Figure 4:
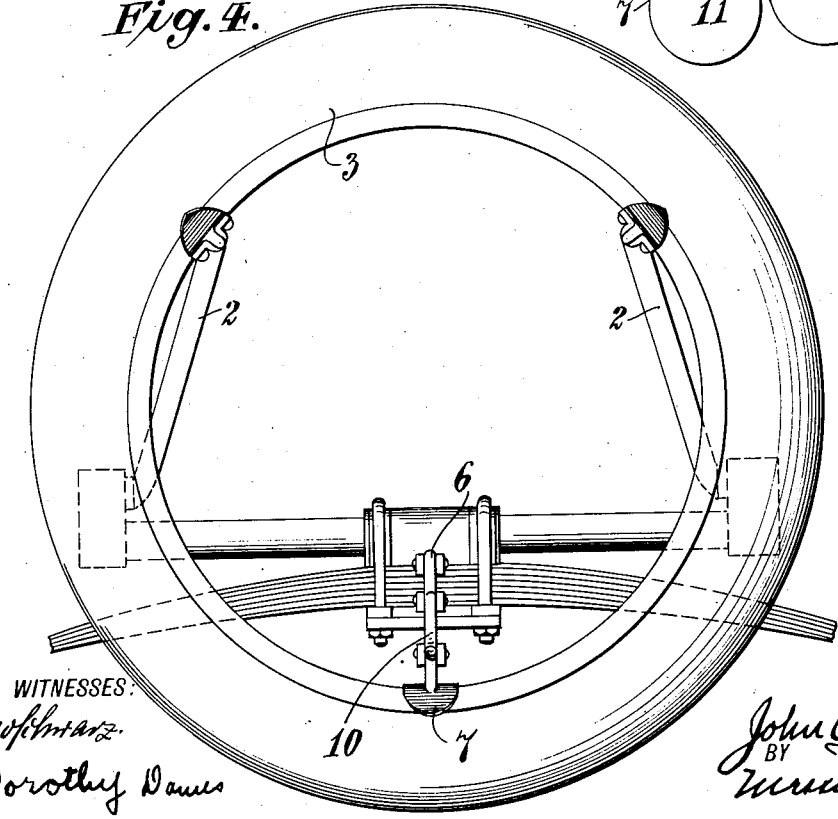
Figure 4 is a rear elevation of the device shown in Figure 3.

In the modification shown in Figures 3 and 4 the initial unlocking movement of the lever 9 causes the toggle to break and the link 11 moves about its inner pivotal connection thereby releasing the outer member 7 from its engagement with the outer tire. The further movement of the lever in the upward direction swings the inner member 7 about its pivotal connection with the bracket 5 thus releasing the inner tire.

By means of a construction of this character one or more tires may be carried securely on the vehicle without the possibility of the loosening of holding parts as the engagement may be so regulated that the tires are under a slight tension, regulated by the turn-buckle, which re-acts on the toggle to hold the same in locking position.

Where a plurality of tires are carried, a quick release of these tires is provided and if desired, one tire can be released at a time without disturbing the engagement of the locking means with the remaining tires.

Although I have shown only one form of mechanism embodying my invention, it is obvious that various changes and modifications within the skill of the mechanic may be made therein without departing from the spirit of the invention, provided the means set forth in the following claims are employed.

Having thus described my invention, I claim:

1. In a tire support, the combination with fixed means for holding a plurality of tires, of a tire fastening device for drawing the tires into firm engagement with said fixed means, said device comprising a pivoted tire engaging member, a second tire engaging member, a link pivoted at opposite ends to said members, a toggle connection comprising two members pivoted together and having the end of one member pivoted for movement about a fixed axis and the end of the other member pivoted to said link intermediate its ends, one of said pivoted members having an actuating handle for varying the angular relation of said members, thereby to move said tire engaging members into operative and inoperative position.

2. In a tire carrier, tire locking means comprising a pivoted member adapted to move to and from a tire engaging position, a second tire engaging member, said second member having a swinging movement relative to said first mentioned member to and from a tire engaging position and a manually actuated member having a pivotal connection with both of said tire engaging members and adapted to move the same to and from their tire engaging positions.

3. In a tire carrier, the combination with a support for a plurality of tires, and tire engaging members adapted to contact with the inside of said tires to hold the same on said support, of a unitary actuating means coupled to said members for releasing and successively moving the same into inoperative position.

4. In a tire carrier, a tire locking means adapted to engage a plurality of tires and including a pivoted lever provided with an actuating handle, a plurality of tire engaging members, one for each tire and an operative connection between said lever and members.

5. In a tire carrier for vehicles the combination of a supporting ring adapted to fit into a demountable rim, a peripheral flange formed integral with and extending from said ring at one edge adapted to have a portion of a tire positioned within the angle and a locking member comprising a pivoted lever and a tire engaging element carried by said lever and movable diametrically of the tire into engagement with said rim on the inner periphery thereof to lock the same within said angle in contact with said flange.

6. In a tire carrier, the combination with a fixed tire engaging support, of a locking member including a movable tire engaging member having means for varying the position assumed by said movable tire engaging member when the locking member is in locking position and means for forcing said tire engaging member into its locking position.

7. In a tire carrier, the combination with fixed means for engaging the side of a tire, of means movable away from said fixed means to hold the tire on said fixed means, said movable means having a limited movement towards the tire and means for varying the extent of said movement.

8. In a tire holder, the combination with a tire-engaging member, of a second tire-engaging member movable toward and from the same, and a toggle connecting the members for moving the latter, said toggle comprising pivotally connected links, one of which is extensible.

9. In a tire carrier for vehicles, the combination of a supporting ring adapted to fit into a demountable rim, a peripheral flange formed integral with and extending from said ring at one edge, attaching means for securing the ring to a vehicles, and means for securing the rim on said ring in contact with said flange.

10. A tire carrier comprising an annular tire supporting member in the form of a metal rim adapted substantially to fit the inner periphery of the tire, having a free open space therethrough within the periphery thereof and having an outwardly extending flange projecting from one of its edges, a tire engaging member confined to the edge of said rim on the side of the rim opposite the edge provided with the flange and fastening means engaging said tire engaging member to lock the same in position, said fastening means being accessible from said opposite side of the tire supporting member.

11. In a tire carrier for vehicles, the combination of a supporting ring adapted to fit into a demountable rim, a peripheral flange formed integral with and extending from said ring, at one edge, attaching means for securing the ring to a vehicle, fixed means at one point on said ring adapted to engage and retain the rim against removal from the ring at that point when the rim is moved bodily in a direction perpendicular to the plane of the ring, and an adjustable clamp at another point on said ring adapted to be adjusted into or out of engagement with said rim at this point and to hold the rim in contact with said flange.

12. In a carrier for vehicles, the combination of a supporting ring adapted to fit into a demountable rim, attaching means for securing the ring to a vehicle, said ring including fixed means at one point thereof adapted to engage said rim at that point, a rim engaging member at another point on said ring adapted to be turned into or out of engagement with said rim at that point and actuating means including an adjustable screw member for fixing said rim engaging member in locking position with respect to said rim.

13. In a spare tire carrier for vehicles, the combination of a narrow open supporting ring adapted to fit into a demountable rim, a peripheral flange formed integral with and extending from said ring at one edge, attaching means for securing the ring to a vehicle, and means for securing the rim on said ring and in pressure contact with said flange, including fixed non-releasable rim securing means at one point of the ring and adjustable readily releasable rim securing means at another part of the ring.

14. A spare tire carrier comprising an annular tire supporting member in the form of a narrow metal ring adapted substantially to fit the inner periphery of the rim of a spare tire, having a free open space therethrough within the periphery thereof and having an outwardly extending flange projecting from one of its edges, non-radial bracket means for mounting said supporting rim on a vehicle, a movable tire engaging member confined to the edge of said rim on the side of the rim opposite the edge provided with the flange, operable in the open space through the supporting ring and fastening means engaging said tire engaging member to lock the same in position, said fastening means being accessible from said opposite side of the tire supporting member.

15. A spare tire carrier comprising an arched support of semi-circular extent and having a diameter less than the rim of the tire which it is to support, provided with means for mounting the same at the back of a vehicle, whereby a rim carrying a spare tire can be engaged thereover and be supported thereon, said arched support having a shoulder at the inner edge of the same forming a guide and a stop for the rim engaged thereover, a rim securing device located at the upper part of the support, projecting from the outer edge of the support to pass through the rim and engage over the outer side of the rim as the rim is hooked over the support and to thereupon serve with the support and shoulder as a saddle supporting the rim about which the rim can be swung into position over the balance of the support and a rim securing device at the lower portion of the support adjustable to engage and hold the rim on the support and to force the rim into firmly held engagement with the upper rim securing means.

16. A spare tire carrier comprising a substantially cylindrical but narrow, open ring of less diameter than the rim of the tire which it is to support, provided with means for mounting the same at the back of a vehicle, whereby a rim carrying a spare tire can be engaged thereover and be supported thereon, said ring having a shoulder at the back or inner edge of the same forming a guide and a stop for the rim engaged thereover, a rim securing device located at the upper part of the ring, projecting from the outer edge of the ring to pass through the rim and engage over the outer side of the rim as the rim is hooked over the ring and to thereupon serve with the ring and back shoulder as a saddle supporting the rim about which the rim can be swung into position over the balance of the ring and a rim securing device at the lower portion of the ring adjustable to engage and hold the rim on the ring and to force the rim into firmly held engagement with the upper rim securing means.

This specification signed and witnessed this 9th day of October, A. D. 1913.

JOHN G. PERRIN.